US008300914B2

(12) United States Patent
Ueda

(10) Patent No.: US 8,300,914 B2
(45) Date of Patent: Oct. 30, 2012

(54) TRANSACTION PROCESSING APPARATUS

(75) Inventor: Hiroyuki Ueda, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 650 days.

(21) Appl. No.: 12/505,733

(22) Filed: Jul. 20, 2009

(65) Prior Publication Data

US 2010/0021020 A1 Jan. 28, 2010

(30) Foreign Application Priority Data

Jul. 28, 2008 (JP) .................................. 2008-193861

(51) Int. Cl.
*G06K 9/00* (2006.01)
(52) U.S. Cl. ........ 382/135; 382/136; 382/137; 382/138; 382/139; 382/140
(58) Field of Classification Search .......... 382/135–140; 902/1–41; 705/42, 43
See application file for complete search history.

(56) References Cited

U.S. PATENT DOCUMENTS

| | | | | |
|---|---|---|---|---|
| 4,608,486 | A * | 8/1986 | Berstein et al. ................ | 235/380 |
| 7,389,914 | B1 * | 6/2008 | Enright et al. ................ | 235/379 |
| 7,454,047 | B2 * | 11/2008 | Ragsdale ........................ | 382/128 |
| 7,523,856 | B2 * | 4/2009 | Block et al. .................... | 235/379 |
| 7,533,806 | B1 * | 5/2009 | Enright et al. ................ | 235/379 |

FOREIGN PATENT DOCUMENTS

| | | |
|---|---|---|
| CN | 101039183 A | 9/2007 |
| JP | 49-5233 | 1/1974 |
| JP | 62-159299 | 7/1987 |
| JP | 10-11660 | 1/1998 |
| JP | 2001-155254 | 6/2001 |
| JP | 2003-099853 | 4/2003 |
| JP | 2007-226319 | 9/2007 |
| JP | 2007-249590 | 9/2007 |

OTHER PUBLICATIONS

Japanese Office Action for 2008-193861 mailed on Jun. 1, 2010.
Chinese Office Action for Application No. 200910008600.1 mailed on Mar. 15, 2011.

* cited by examiner

*Primary Examiner* — Brian Le
(74) *Attorney, Agent, or Firm* — Turocy & Watson, LLP

(57) ABSTRACT

A transaction processing apparatus includes a display unit, a base unit, and an attaching and detaching unit that connects circuits of the display unit and the base unit. The display unit includes an authentication-information acquiring unit that acquires, in a state in which the display unit is detached from the base unit, identity authentication information of a customer and an authentication-information storing unit that stores the acquired identity authentication information. The base unit includes a registered-information acquiring unit that acquires registered authentication information that should be compared with the identity authentication information, an identity authentication unit that performs identity authentication on the basis of the identity authentication information stored by the authentication-information storing unit and the registered authentication information acquired by the registered-information acquiring unit, and a card-settlement permitting unit that permits card settlement when a result of the identity authentication is affirmative.

4 Claims, 5 Drawing Sheets

TRANSACTION PROCESSING APPARATUS

CROSS-REFERENCE TO RELATED APPLICATION

This application is based upon and claims the benefit of priority from the prior Japanese Patent Application No. 2008-193861, filed Jul. 28, 2008, the entire contents of which are incorporated herein by reference.

TECHNICAL FIELD

The present invention relates to a transaction processing apparatus that is used in checkout processing for sold commodities and can perform card settlement using a magnetic card such as a credit card.

BACKGROUND

When settlement for commodities is performed in mass merchandisers and the like, transaction processing apparatuses such as POS terminals are used.

Among the transaction processing apparatuses, there is a transaction processing apparatus including a display with touch panel and a card reader. The display with touch panel functions as a GUI (Graphical User Interface) that can perform both display of processing content and operation input. When various magnetic cards such as a credit card and a point card and an IC card are inserted in the card reader and slid, the card reader reads data recorded in the cards. When commodities are sold by using the transaction processing apparatus, first, an operator touch-operates the display with touch panel to register sold commodity data. The transaction processing apparatus performs cash settlement for receiving, from a customer, cash corresponding to a subtotal amount calculated on the basis of registered commodity data or card settlement for reading, with the card reader, information stored in a magnetic card such as a credit card or a cash card presented by the customer and transmitting settlement information to a card company. In recent years, the card settlement tends to increase. Stores take measures against such tendency by issuing original cards and granting privileges such as points when the card settlement is performed.

The card settlement involves probability that a person who is not an owner of a card illegally acquires the card and performs payment using the card. Therefore, as disclosed in JP-A-2001-155254, it is a general practice to perform identity authentication by causing a customer to input a personal identification number of a card.

In recent years, in some case, a transaction employing an identity authentication system that uses biometrics information such as face image data of a customer is performed.

Some customer desires to personally perform sliding of a card through a card reader and various kinds of operation for ending a transaction for fear of leakage of card information. When a display and an input device are provided on a customer side as in a commodity sales data processing apparatus disclosed in JP-A-2001-155254, the customer himself or herself can easily perform operation concerning card settlement. However, in the case of a small transaction settlement apparatus not including a display and an input device on a customer side, the customer himself or herself cannot perform operation concerning card settlement unless a setting direction of the transaction processing apparatus is changed to set display of a display with touch panel in front of the customer any time.

In performing identity authentication using face image data as the biometrics information, it is necessary to photograph the face image data at an appropriate angle. When the small transaction processing apparatus is used, it is necessary to separately prepare a device exclusively used for photographing and photograph a face of a customer from an appropriate position and an appropriate angle. Therefore, when the device exclusively used for photographing is separately prepared in this way, a setting space has to be secured and, moreover, the arrangement of devices around a register is complicated.

SUMMARY

It is an object of the present invention to provide a transaction processing apparatus that can cause a customer himself or herself to perform a series of card settlement processing without separately preparing a connecting device or providing a body with a device exclusively used for user operation and can secure safety of a transaction while protecting privacy of the customer.

According to an aspect of the present invention, there is provided a transaction processing apparatus including a card reading unit that reads information stored in a magnetic card, the transaction processing apparatus performing card settlement for a transaction on the basis of the information of the magnetic card read by the card reading unit, the transaction processing apparatus including: a display unit having a display that displays various kinds of information; a base unit on which the display unit can be placed; and an attaching and detaching unit that connects various circuits of the display unit and the base unit when the display unit is placed on the base unit. The display unit includes: an authentication-information acquiring unit that acquires, in a state in which the display unit is detached from the base unit, identity authentication information of a customer who performs card settlement; and an authentication-information storing unit that stores the identity authentication information acquired by the authentication-information acquiring unit. The base unit includes: a registered-information acquiring unit that acquires, on the basis of the information read by the card reading unit, registered authentication information that should be compared with the identity authentication information; an identity authentication unit that performs, when the display unit is placed on the base unit, identity authentication on the basis of the identity authentication information stored by the authentication-information storing unit and the registered authentication information acquired by the registered-information acquiring unit; and a card-settlement permitting unit that permits card settlement when a result of the identity authentication by the identity authentication unit is affirmative.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

An embodiment of the present invention is explained below with reference to the accompanying drawings.

Figure 1:
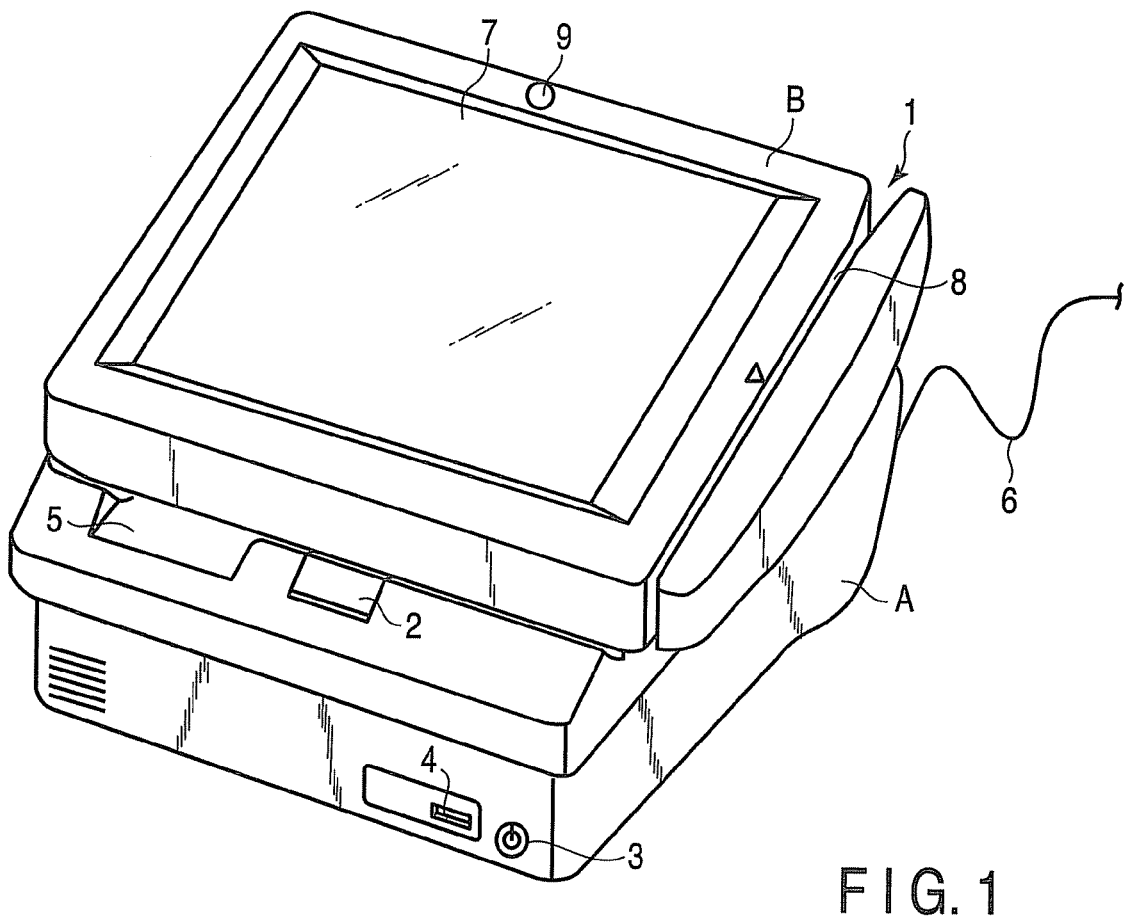
FIG. 1 is a perspective view of an external appearance of a transaction processing apparatus according to an embodiment of the present invention.

FIG. 1 is a perspective view of an external appearance of a transaction processing apparatus 1 according to the present invention. In the transaction processing apparatus 1, a display unit B is attached to a base unit A. The base unit A includes an open and close button 2, a power supply button 3, a USB port 4, a receipt issue port 5, and a not-shown LAN (Local Area Network) interface (I/F) 15. The base unit B includes a display with touch panel 7, a card reader 8, and a CCD (Charge Coupled Device) camera 9.

A receipt printed by a printer incorporated in the base unit A is discharged from the receipt issue port 5. A LAN cable 6 that communicates with the transaction processing apparatus 1 to a communication network is connected to the LAN interface 15.

The display with touch panel 7 functions as a GUI that can perform both display of processing content and operation input. When various magnetic cards such as a credit card and a point card and an IC card are inserted in the card reader 8 and slid, the card reader 8 reads data recorded in the cards.

Figure 2:
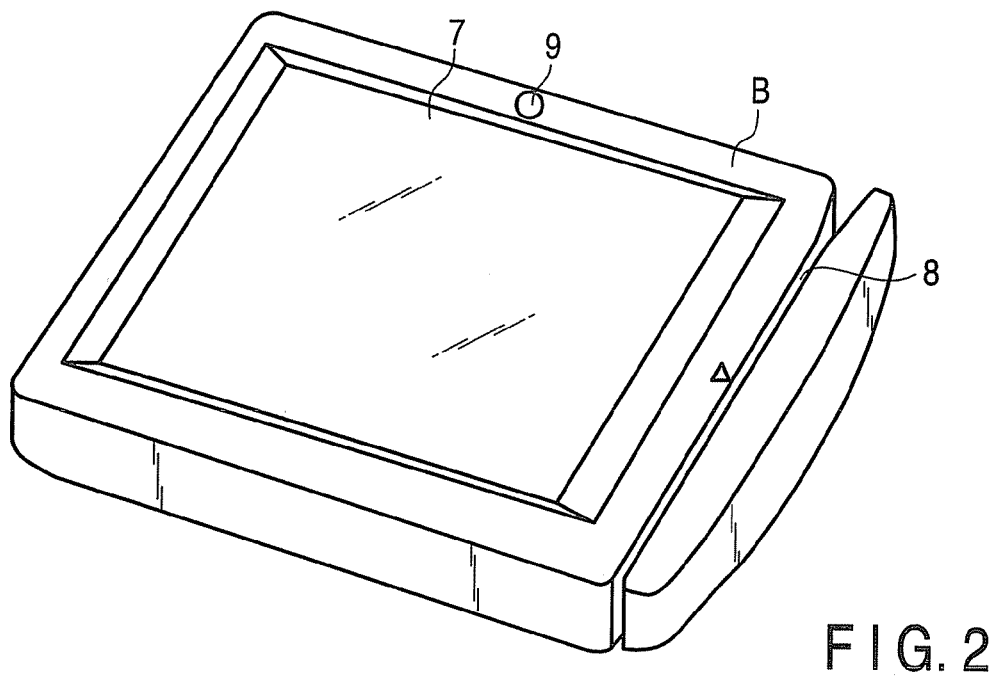
FIG. 2 is a perspective view of a display unit detached from a base unit of the transaction processing apparatus according to the embodiment.

When a user operates the open and close button 2, lock for fixing the display unit B to the base unit A is released. As shown in FIG. 2, the user can detach the display unit B from the base unit A.

Figure 3:
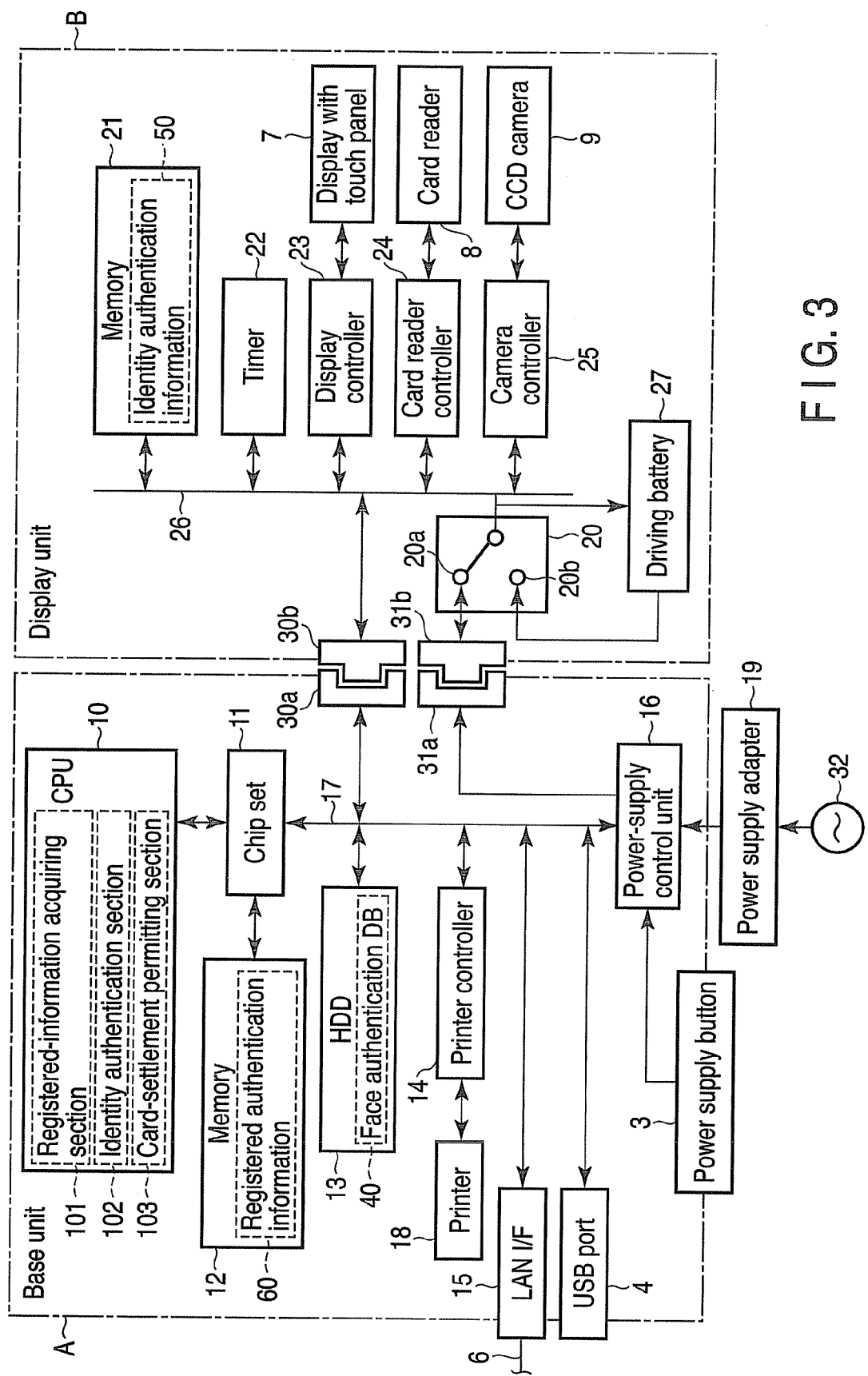
FIG. 3 is a block diagram of a control circuit of the transaction processing apparatus according to the embodiment.

FIG. 3 is a block diagram of a control circuit of the transaction processing apparatus 1. In the transaction processing apparatus 1, a CPU 10 that functions as a main control section is mounted on the base unit A. A chip set 11, a memory 12 including a ROM (Read Only Memory) and a RAM (Random Access Memory), a hard disk drive (HDD) 13, a printer controller 14, the LAN interface 15, the USB port 4, and a power-supply control unit 16 are connected to the CPU 10 via a bus line 17 including an address bus and a data bus. An attaching and detaching mechanism 30a for connecting a control circuit of the base unit A to a control circuit of the display unit B is connected to the bus line 17. An attaching and detaching mechanism 31a for connecting a power supply circuit of the base unit A to a power supply circuit of the display unit B is connected to the power-supply control unit 16.

The chip set 11 controls information flow of management of data exchange and the like. The chip set 11 includes a north bridge and a south bridge. The north bridge connects the CPU 10 and the bus line 17. The south bridge functions as various controllers. The memory 12 stores in advance, for example, a program for causing the CPU 10 to execute control operation.

The memory 12 forms various memory areas used by the CPU 10 for arithmetic processing such as a memory area for registered authentication information 60 explained with reference to FIG. 6 later. Various databases necessary for the settlement of transaction processing, key data for encryption and decryption of a telegram used during communication with a host computer of a bank, various programs, and the like are stored in the hard disk drive 13. The printer controller 14 controls to drive a printer 18. The printer 18 is a thermal printer that controls applied voltage on a thermal head to cause a heat generating element included in the thermal head to generate heat and forms, with thermal transfer, a print pattern such as characters on a print medium such as thermal recording paper. The power-supply control unit 16 receives DC power supplied from a power supply adapter 19 according to the operation of the power supply button 3 and supplies the DC power to the units of the transaction processing apparatus 1. The power supply adapter 19 converts AC power supplied from a commercial power supply 32 into stable DC power and then supplies the DC power to the power-supply control unit 16.

In the control circuit of the display unit B, a memory 21 including a ROM and a RAM, a timer 22 that measures time, a display controller 23, a card reader controller 24, and a camera controller 25 are connected via a bus line 26 including an address bus and a data bus. An attaching and detaching mechanism 30b formed in a shape that fits with the attaching and detaching mechanism 30a is connected to the bus line 26. An attaching and detaching mechanism 31b formed in a shape that fits with the attaching and detaching mechanism 31a is connected to the power supply circuit of the display unit B via a switch 20.

The memory 21 functions as an authentication-information storing unit according to this embodiment. Identity authentication information 50 and the like explained with reference to FIG. 6 later are stored in the memory 21. The display controller 23 causes the display with touch panel 7 to display various kinds of information such as a massage and captures input data corresponding to touch operation by the user on the display with touch panel 7. The card reader controller 24 reads magnetic information stored in a card slid through the card reader 8. The camera controller 25 controls to drive the CCD camera 9 and photographs a face image of a customer.

The switch 20 includes a connection terminal 20a for connecting the power supply circuit of the display unit B and the power supply circuit of the base unit A and a connection terminal 20b for connecting the power supply circuit of the display unit B to a driving battery 27 included in the display unit B.

When the display unit B is appropriately placed on the base A, the attaching and detaching mechanism 30a and the attaching and detaching mechanism 30b fit with each other. Then, the control circuit of the base unit A and the control circuit of the display unit B are connected. The respective units of the display unit B are controlled by the CPU 10 and operates. When the display unit B is appropriately placed on the base unit A, the attaching and detaching mechanism 31a and the attaching and detaching mechanism 31b fit with each other. Then, the connection of the switch 20 changes to the connection terminal 20a and the power supply circuit of the base unit A and the power supply circuit of the display unit B are connected. The driving battery 27 receives power supply from the power-supply control unit 16 and is charged.

On the other hand, when the user operates the open and close button 2 and detaches the display unit B from the base unit A, the connection between the control circuit of the base unit A and the control circuit of the display unit B is released. The units of the display unit B are not controlled by the CPU 10 and operate on the basis of an operation program stored in the memory 21. The connection between the power supply circuit of the base unit A and the power supply circuit of the display unit B is released, the switch 20 changes to the connection to the connection terminal 20b, and power stored in the driving battery 27 is supplied to the units of the display unit B.

The attaching and detaching mechanisms 30a, 30b, 31a, and 31b and the switch 20 configure an attaching and detaching unit according to this embodiment.

Figure 4:
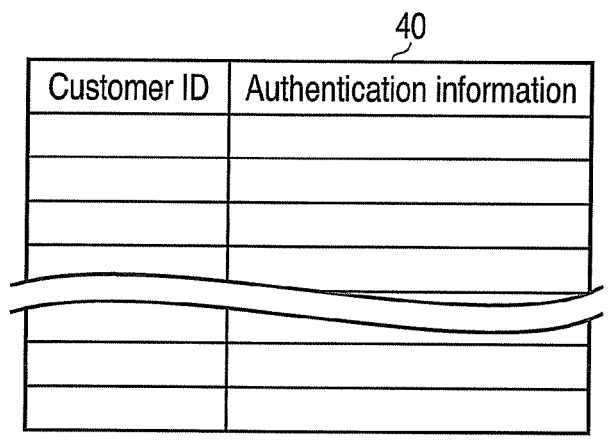
FIG. 4 is a schematic diagram of an example of data structure of a face authentication database according to the embodiment.

In checkout processing performed by the transaction processing apparatus 1, when card settlement by a credit card or a cash card is selected, identity authentication for a customer is performed. The identity authentication is performed by personal identification number authentication for the card used for the settlement or face authentication for the customer. A face authentication database (DB) 40 having registered therein face image data used for the face authentication is stored in the hard disk driver 13. FIG. 4 is a schematic diagram of an example of data structure of the face authentication database 40. In the face authentication database 40, face image data of a customer is stored in association with a customer ID, which is an identifier of the customer, stored in a magnetic card such as a credit card.

As main functions, the CPU 10 has means (1) to (3) explained below.

(1) A registered-information acquiring section 101 that acquires the registered authentication information 60 that should be compared with the identity authentication information 50. The identity authentication information 50 is a personal identification number input via the display with touch panel 7 and a face image of a customer photographed by the CCD camera 9.

(2) An identity authentication section 102 that performs, when the display unit B is placed on the base unit A, identity authentication on the basis of the identity authentication information 50 stored in the memory 21 and the registered authentication information 60 acquired by the registered-information acquiring section 101.

(3) A card-settlement permitting section 103 that permits card settlement when a result of the identity authentication by the identity authentication section 102 is affirmative.

Actions by the configuration explained above are explained below.

Figure 5:
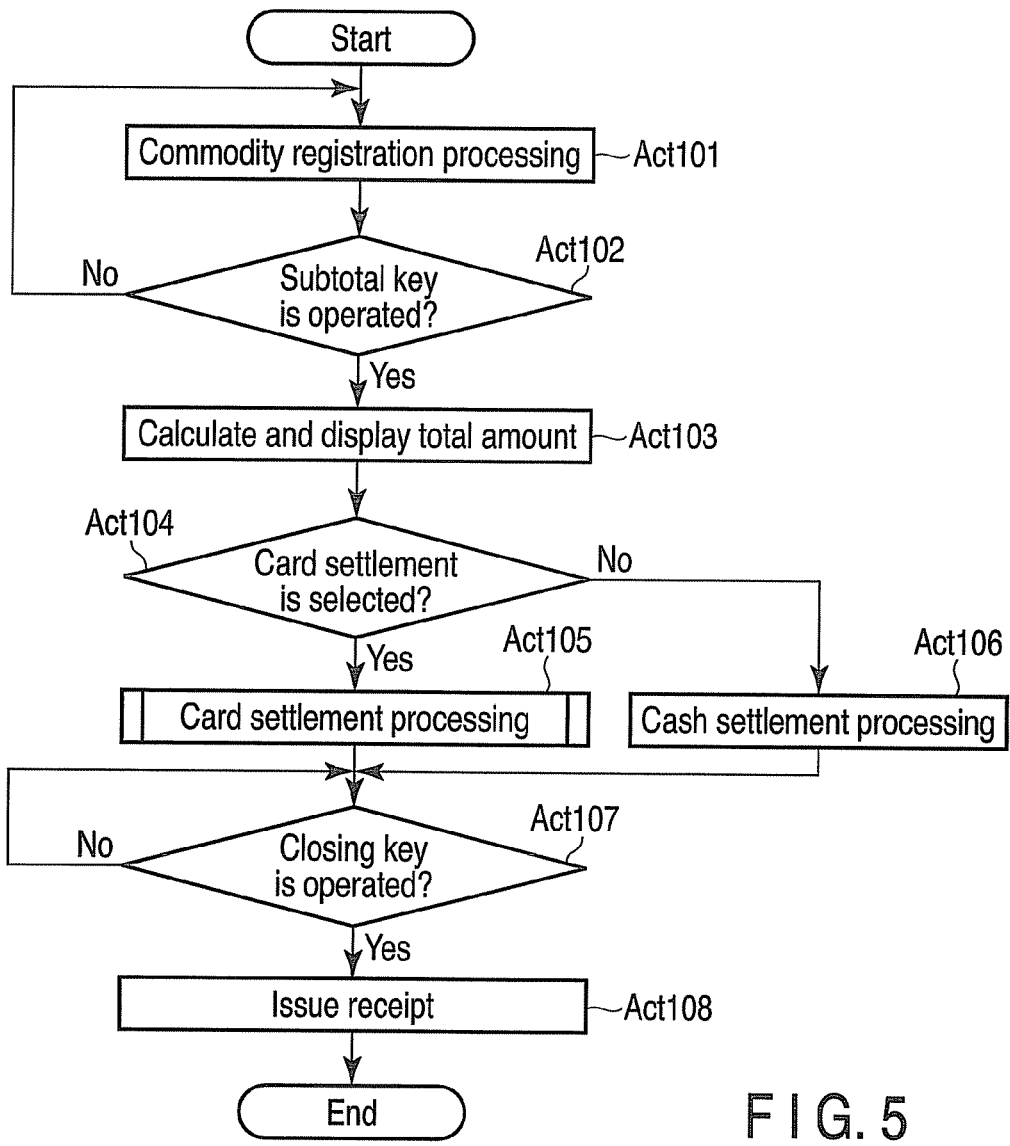
FIG. 5 is a flowchart of processing executed by a CPU in sales processing according to the embodiment.

FIG. 5 is a flowchart of processing executed by the CPU 10 of the transaction processing apparatus 1 in sales processing for commodities. An operation program for executing the processing is stored in the memory 12.

First, the CPU 10 receives registration of a purchased commodity by touch operation on the display with touch panel 7 (Act 101). When the registration of the purchased commodity is received, the CPU 10 accesses an external apparatus such as a store server via the LAN interface 15, acquires commodity data such as a price of the commodity, and stores the commodity data in the memory 12.

The CPU 10 determines whether a subtotal key displayed on the display with touch panel 7 is touch-operated (Act 102). When the CPU 10 determines that the subtotal key is not touch-operated (No in Act 102), the CPU 10 receives registration of a purchased commodity again (Act 101). In this way, commodity data of commodities, registration of which is received, are cumulatively stored in the memory 12 until the subtotal key is touch-operated.

When the CPU 10 determines that the subtotal key is touch-operated while repeating the processing in Act 101 and Act 102 (Yes in Act 102), the CPU 10 calculates a total amount of the transaction on the basis of the commodity data cumulatively stored in the memory 12 and displays the calculated total amount on the display with touch panel 7 (Act 103). At the same time, the CPU 10 displays, on the display with touch panel 7, a checkout method selection button for selecting which of cash settlement and card settlement is used for settlement.

Thereafter, the CPU 10 determines whether the card settlement is selected by the operation of the checkout method selection button displayed on the display with touch panel 7 (Act 104). When the CPU 10 determines that the card settlement is selected (Yes in Act 104), the CPU 10 executes card settlement processing explained later with reference to FIG. 6 (Act 105). On the other hand, when the CPU 10 determines that the card settlement is not selected (No in Act 104), the CPU 10 executes cash settlement processing (Act 106).

When the cash settlement processing is executed, the CPU 10 displays a ten key on the display with touch panel 7 and receives the input of a payment amount by a customer via the ten key.

The CPU 10 determines whether a closing key displayed on the display with touch panel 7 is touch-operated (Act 107). The CPU 10 repeats this processing until the CPU 10 determines that the closing key is touch-operated (No in Act 107). When the CPU 10 determines that the closing key is touch-operated (Yes in Act 107), the CPU 10 controls to drive the printer 18 via the printer controller 14 and issues a receipt on which content of the transaction is printed (Act 108).

When the cash settlement is performed, a payment amount of the customer and a change amount calculated by subtracting a subtotal amount from the payment amount are printed on the receipt together with the transaction content. When the card settlement is performed, a copy for a store on which a signature space for a customer and the like are printed is issued together with the receipt on which the transaction content is printed. After issuing the receipt in this way, the CPU 10 ends the sales processing.

The card settlement processing is explained below.

Figure 6:
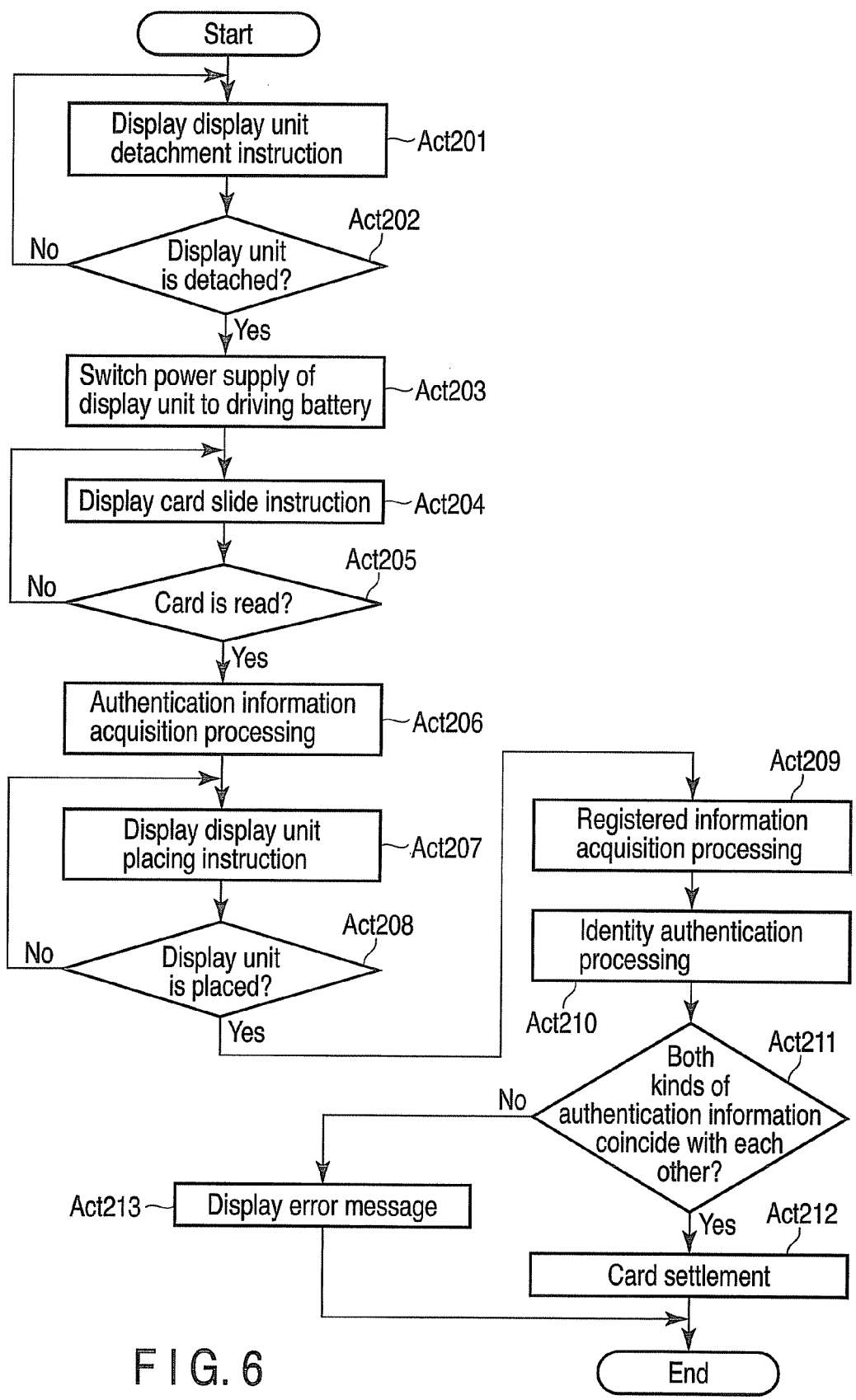
FIG. 6 is a flowchart of card settlement processing according to the embodiment.

FIG. 6 is a flowchart of processing executed by the units of the transaction processing apparatus 1 in the card settlement processing. First, the CPU 10 controls the display with touch panel 7 to display an instruction that the display unit B should be detached (Act 201). Subsequently, the CPU 10 determines whether the display unit B is detached from the base unit A (Act 202). While the CPU 10 determines that the display unit B is not detached from the base unit A (No in Act 202), the CPU 10 continues to display, on the display with touch panel 7, the instruction that the display unit B should be detached.

When the CPU 10 determines that the display unit B is detached from the base unit A (Yes in Act 202), the connection of the switch 20 changes from the connection terminal 20a to the connection terminal 20b and power supply from the driving battery 27 to the units of the display unit B is started (Act 203). After the power supply for the display unit B is switched to the driving battery 27, the units of the display unit B operate on the basis of an operation program stored in the memory 21.

First, the display controller 23 controls the display with touch panel 7 to display an instruction that a magnetic card carried by the customer should be slid through the card reader 8 (Act 204). The card reader controller 24 stands by for reading of the magnetic card by the card reader 8 (Act 205). The display controller 23 continues to display the instruction on the display with touch panel 7 until the magnetic card is read by the card reader 8 (No in Act 205, Act 204). When the card reader controller 24 determines that the magnetic card is read by the card reader 8 (Yes in Act 205), the card reader controller 24 stores read magnetic information in the memory 21. Thereafter, authentication information acquisition processing is executed (Act 206).

Specifically, the display controller 23 displays, on the display with touch panel 7, an instruction that the input of a personal identification number and photographing processing for a face image should be performed. The display controller 23 displays the ten key on the display with touch panel 7 and receives the input of the personal identification number via the ten key. The camera controller 25 receives the photographing of a face image by the CCD camera 9. When a face image is photographed, the camera controller 25 sequentially transmits videos photographed by the CCD camera 9 to the display controller 23. The display controller 23 sequentially displays the videos transmitted from the camera controller 25 on the display with touch panel 7. Therefore, the customer can adjust a position and an angle of the face of the customer with respect to the CCD camera 9 to a position and an angle suitable for photographing while checking videos displayed on the display with touch panel 7 on a real time basis. When the adjustment of the position and the angle of the face is completed, the customer touch-operates a photographing key displayed on the display with touch panel 7. The CCD camera 9 photographs a face image for authentication with the touch operation of the photographing key as a trigger. The input personal identification number and the photographed face image are stored in the memory 21. The display controller 23 and the camera controller 25 that acquire the personal identification number and the face image as the identity authentication information 50 in the authentication information acquisition processing in this way configure an authentication-information acquiring unit according to this embodiment. The display with touch panel 7 that receives the input of the personal identification number for using the magnetic card read by the card reader 8 configures an input receiving unit.

After the authentication information acquisition processing is completed, the display controller 23 displays, on the display with touch panel 7, an instruction that the display unit B should be placed on the base unit A (Act 207). The display controller 23 determines whether the display unit B is placed on the base unit A (Act 208). The display controller 23 continues to display, on the display with touch panel 7, the instruction that the display unit B should be placed on the base unit A until the display controller 23 determines that the display unit B is placed on the base unit A (No in Act 208). When the display controller 23 determines that the display unit B is placed on the base unit A (Yes in Act 208), the display controller 23 deletes the instruction displayed on the display with touch panel 7.

When the display unit B is placed on the base unit A and the attaching and detaching mechanism 30a and the attaching and detaching mechanism 30b fit with each other, the control circuit of the base unit A and the control circuit of the display unit B are connected to each other. Thereafter, the units of the display unit B operate under the control by the CPU 10. When the attaching and detaching mechanism 31a and the attaching and detaching mechanism 31b fit with each other, the connection of the switch 20 changes from the connection terminal 20b to the connection terminal 20a and the power supply circuit of the base unit A and the power supply circuit of the display unit B are connected. Thereafter, the units of the display unit B receive power supply from the power-supply control unit 16 and operate. The driving battery 27 receives power supply from the power-supply control unit 16 and starts charging.

According to the connection of the control circuits and the power supply circuits of the base unit A and the display unit B, the registered-information acquiring section 101 of the CPU 10 executes registered information acquisition processing (Act 209). In this processing, first, the registered-information acquiring section 101 accesses, on the basis of the magnetic information read from the magnetic card and stored in the memory 21 by the card reader 8, a server of a management company for the card via the LAN interface 15 and acquires a personal identification number allocated to the card. Further, the registered-information acquiring section 101 acquires a customer ID from the magnetic information and acquires face image data stored in association with the customer ID from the face authentication database 40. The personal identification information and the face image data acquired in this way are stored in the memory 12 as the registered authentication information 60.

Subsequently, the identity authentication section 102 of the CPU 10 executes identity authentication processing (Act 210). In this processing, first, the identity authentication section 102 compares the personal identification number acquired in the registered information acquisition processing and stored in the memory 12 as the registered authentication information 60 and the personal identification number input in the processing in Act 206 and stored in the memory 21 as the identity authentication information 50. Further, the identity authentication section 102 compares the face image data acquired in the registered information acquisition processing and stored in the memory 12 as the registered authentication information 60 and the face image data photographed by the CCD camera 9 in the processing in Act 206 and stored in the memory 21 as the identity authentication information 50. In the comparison of the face image data, the identity authentication section 102 performs authentication concerning whether the face image data are those of the same person by measuring characteristic points in face data and distances among the points.

Thereafter, the card-settlement permitting section 103 of the CPU 10 determines whether both the kinds of authentication information coincide with each other as a result of the comparison of the personal identification numbers and the face image data (Act 211). When the card-settlement permitting section 103 determines that both the kinds of authentication information coincide with each other (Yes in Act 211), the CPU 10 executes card settlement of the transaction, transmits a settlement result to the server of the card company via the LAN interface 15, and ends the card settlement processing (Act 212). On the other hand, when the card-settlement permitting section 103 determines that both the kinds of authentication information do not coincide with each other (No in Act 211), the CPU 10 displays an error message on the display with touch panel 7 via the display controller 23 and ends the card settlement processing without performing card settlement (Act 213).

Figure 7:
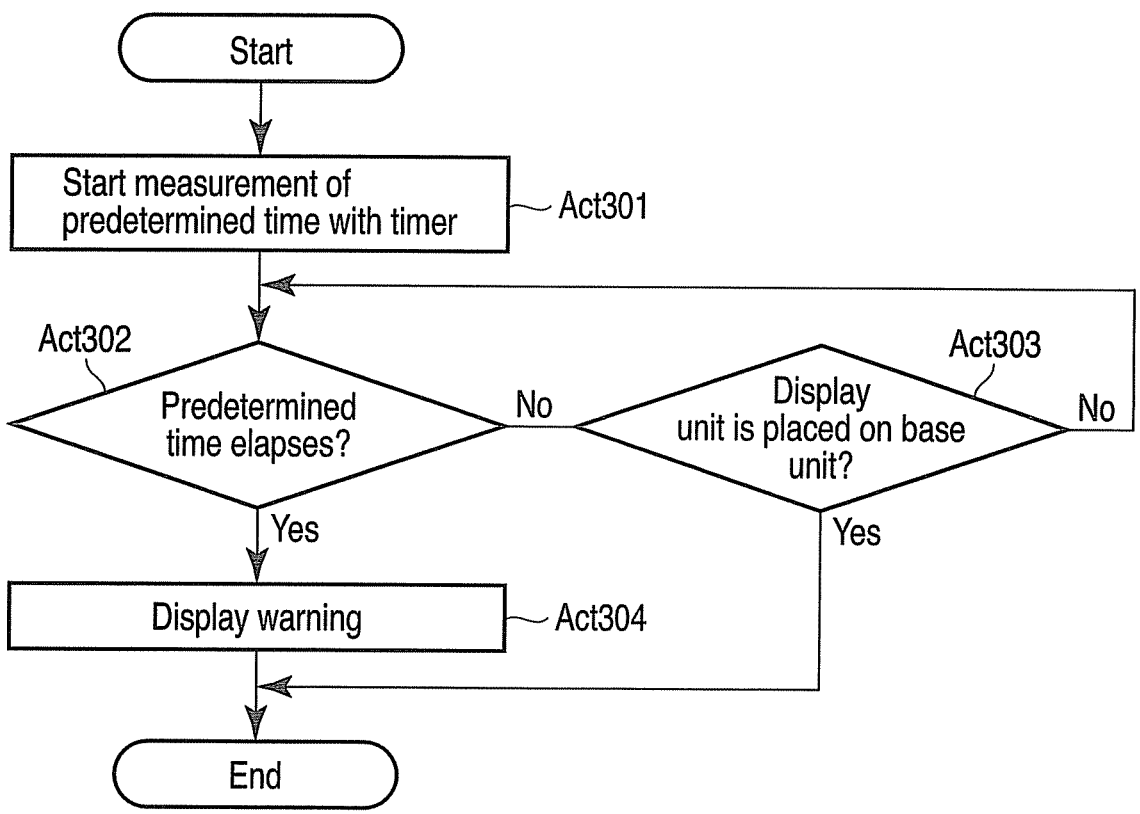
FIG. 7 is a flowchart of detachment time monitoring processing according to the embodiment.

In the display unit B, detachment time monitoring processing for monitoring time during which the display unit B is detached from the base unit A is executed in parallel to the card settlement processing. FIG. 7 is a flowchart of processing executed in the detachment time monitoring processing. First, the timer 22 as a timing unit starts measurement of time with the detachment of the display unit B from the base unit A as a trigger (Act 301).

Thereafter, the timer 22 determines whether the timer 22 finishes measuring monitoring time set in advance (Act 302). When the timer 22 does not finish measuring the monitoring time (No in Act 302), the timer 22 determines whether the display unit B is placed on the base unit A (Act 303). When the display unit B is not placed on the base unit A (No in Act 303), the timer 22 returns to the processing in Act 302 and determines again whether the timer 22 finishes measuring the monitoring time.

On the other hand, when the timer 22 determines in the processing in Act 302 that the timer 22 finishes measuring the monitoring time (Yes in Act 302), the timer 22 transmits a predetermined signal to the display controller 23. According to the reception of this signal, the display controller 23 displays, on the display with touch panel 7, a warning that the monitoring time elapses after the display unit B is detached from the base unit A and ends the detachment time monitoring processing (Act 304). In this way, the timer 22 is a timing unit according to this embodiment and the display controller 23 is a warning unit according to this embodiment.

When the timer 22 determines in the processing in Act 303 that the display unit B is placed on the base unit A (Yes in Act 303), the timer 22 ends the detachment time monitoring processing without outputting the predetermined signal to the display controller 23. Therefore, in this case, the warning is not displayed on the display with touch panel 7.

As explained above, with the transaction processing apparatus 1, it is possible to operate, in a state in which the display unit B is detached from the base unit A, the display unit B to read the card and acquire the personal identification number and the face image data used for the card settlement. Therefore, the customer himself or herself can perform the series of card settlement processing without separately preparing a connection device such as a camera or a display for performing face recognition and providing, for example, a device exclusively used for inputting a personal identification number in an apparatus main body. Therefore, when the customer performs card settlement using the small transaction processing apparatus 1, it is possible to protect privacy of the customer and secure safety of a transaction.

The detachment time monitoring processing is executed in the display unit B. When the monitoring time set in advance elapses after the display unit B is detached from the base unit A, a warning is displayed on the display with touch panel 7. Therefore, it is possible to prevent power shortage of the driving battery 27 due to the detachment of the display unit B for a long time.

By performing identity authentication using face image data, it is possible to perform identity authentication more surely than identity authentication by a personal identification number. It is possible to prevent a person who is not an owner of a magnetic card such as a credit card from illegally using the magnetic card.

In this embodiment, radio units may be provided in the base unit A and the display unit B, respectively, instead of the attaching and detaching mechanisms 30a and 30b to connect the control circuits thereof by radio. Regardless of whether the display unit B is placed on the base unit A, the units of the display unit B are controlled by the CPU 10 to perform the authentication information acquisition processing, the registered information acquisition processing, and the identity authentication processing. Consequently, it is possible to complete card settlement while keeping the display unit B detached as long as power stored in the driving battery lasts. Therefore, smoother checkout processing can be performed.

The identity authentication may be identification authentication performed by using biometrics information such as fingerprint authentication, iris and retina authentication, or vein pattern authentication. Alternatively, the identity authentication may be performed by combining plural pieces of biometrics information and plural personal identification numbers.

The face image data of the customer may be registered in the server of the card management company without being stored in the face authentication database 40. In the registered information acquisition processing, in the same manner as the acquisition of the personal identification number, the registered-information acquiring section 101 accesses the server on the basis of the magnetic information of the card and acquires face image data allocated to the card. Consequently, the customer only has to register the face image data in the server of the card management company. Therefore, labor and time for separately registering the face image data in different stores can be saved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A transaction processing apparatus including a card reading unit that reads information stored in a magnetic card and performs card settlement for a transaction based on the information read from the magnetic card, the transaction processing apparatus further comprising:
    a display unit that displays information used for registration of a commodity;
    a base unit on which the display unit can be placed; and
    an attaching and detaching unit that comprises at least a first attaching and detaching mechanism provided on the base unit and a second attaching and detaching mechanism provided on the display unit wherein the first attaching and detaching mechanism and the second attaching and detaching mechanism are joined when the display unit is placed on the base unit, and circuits of the display unit and the base unit are connected when the first attaching and detaching mechanism is fitted with the second attaching and detaching mechanism, wherein
    the display unit includes:
    an authentication-information acquiring unit that acquires identity authentication information of a customer who performs card settlement when the display unit is detached from the base unit; and
    an authentication-information storing unit that stores the identity authentication information acquired by the authentication-information acquiring unit, and
    the base unit includes:
    a registered-information acquiring unit that gathers registered authentication information to compare with the identity authentication information;
    an identity authentication unit that compares the identity authentication information to the registered authentication information when the display unit is attached to the base unit; and
    a card-settlement permitting unit that permits card settlement when the identity authentication information matches the registered authentication information.

2. The apparatus according to claim 1, wherein the display unit further includes:
    a timing unit that measures a length of time the display unit is detached from the base unit; and
    a warning unit that displays a warning on the display unit when the length of time exceeds a predetermined amount.

3. The apparatus according to claim 1, wherein
    the display unit further includes a camera that photographs an image of a face of a customer and
    the identity authentication unit performs face authentication based on the image of the face.

4. The apparatus according to claim 1, wherein
    the display unit further includes an input receiving unit that receives personal identification number from the magnetic card,
    the identity authentication unit performs identity authentication based on the personal identification number.

\* \* \* \* \*